March 13, 1928.  
C. C. MYRICK  
LEAF COLLECTOR  
Filed Jan. 31, 1927  
1,662,160  
2 Sheets-Sheet 1
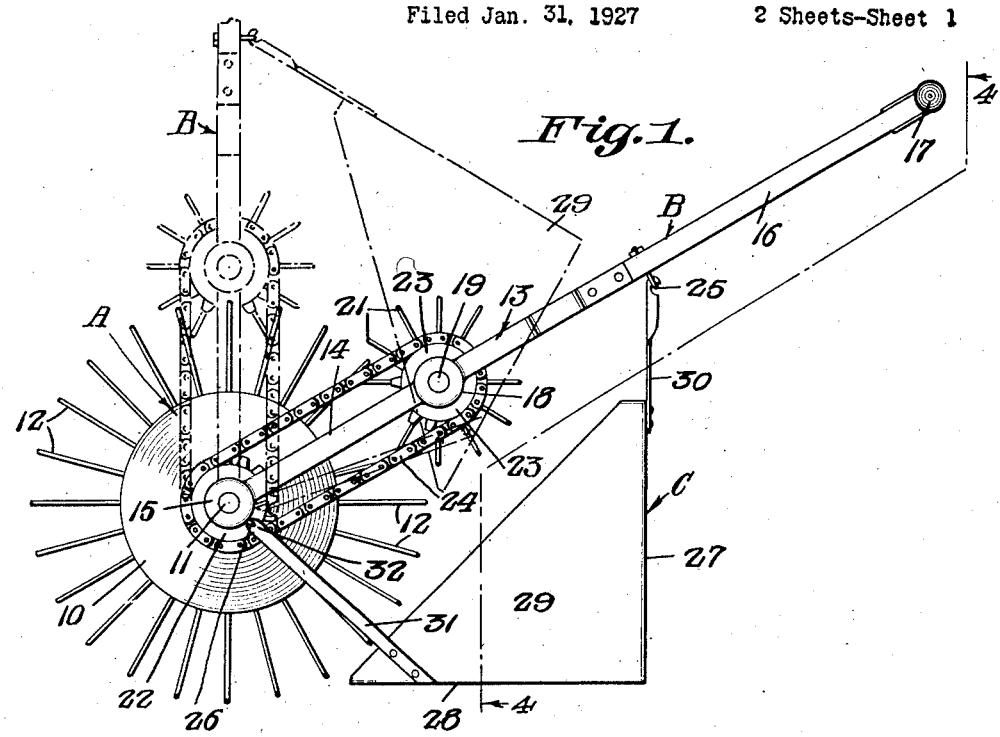
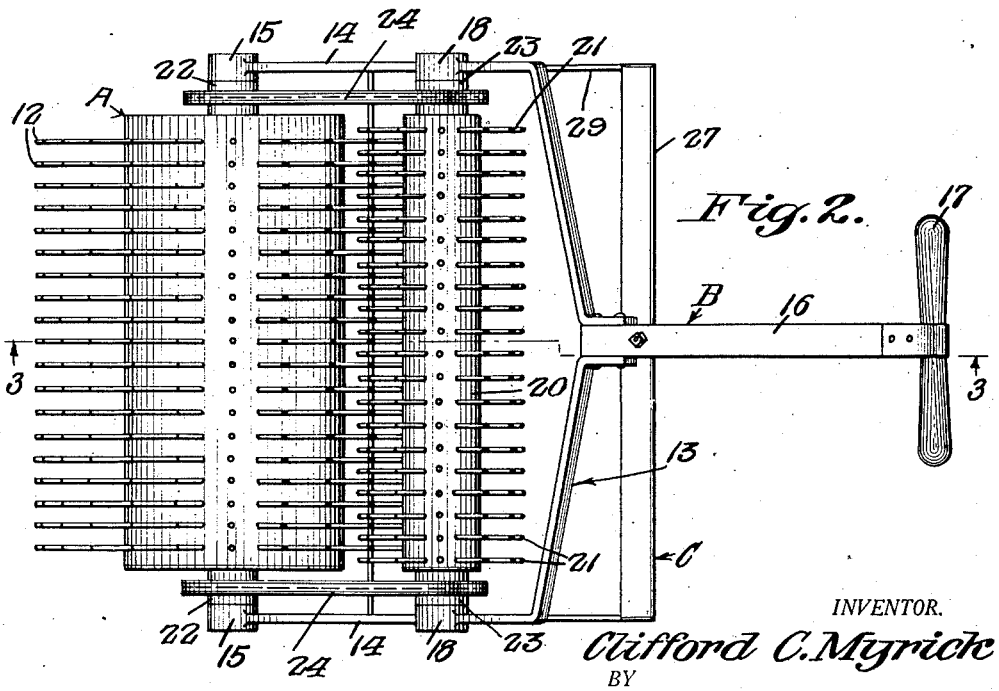
INVENTOR.  
Clifford C. Myrick  
BY  
Geo. P. Kimmel, ATTORNEY.

March 13, 1928.  
C. C. MYRICK  
LEAF COLLECTOR  
Filed Jan. 31, 1927

INVENTOR.  
Clifford C. Myrick  
BY  
Geo. P. Kimmel  
ATTORNEY.

Patented Mar. 13, 1928.

1,662,160

UNITED STATES PATENT OFFICE.

CLIFFORD C. MYRICK, OF TUCSON, ARIZONA.

LEAF COLLECTOR.

Application filed January 31, 1927. Serial No. 164,866.

The invention relates to a leaf gathering nd collecting machine.

The primary object of the invention is the provision of a machine of this character, wherein loose leaves, twigs and grass, or the like, will be conveniently gathered and collected, so that the same can be transported to a point of deposit, as the machine is advanced over a lawn or ground surface, the machine being of novel form, so that leaves, twigs and grass when picked up from the ground will be caused to deposit within a receiver during the gathering operation of said machine when moved over the lawn or ground.

Another object of the invention is the provision of a machine of this character, wherein the gathering element, will be freed of the leaves, twigs or grass gathered or collected thereby, so as to eliminate the clogging of such element, which would result in being ineffective for the purpose intended thereof.

A further object of the invention is the provision of a machine of this character, wherein the hand raking of leaves, twigs, grass, or the like, is entirely eliminated as such leaves, twigs, grass or the like will be automatically gathered and held in bulk for transportation to the point of deposit at the option of the operator of the machine.

A still further object of the invention is the provision of a machine of this character which is comparatively simple in construction, thoroughly reliable and efficient in its purpose, readily and easily handled, enabling the gathering and collection of leaves, twigs, grass or the like with dispatch, and inexpensive to manufacture.

With these and other objects in view, the invention consists in the features of construction, combination and arrangement of parts, as will be hereinafter more fully described, illustrated in the accompanying drawings showing the preferred embodiments of the invention, and pointed out in the claim hereunto appended.

In the accompanying drawings:—

Figure 1 is a side elevation of a machine constructed in accordance with the invention, showing by full lines the gathering or collecting position, while by dotted lines is shown the position of the machine for the dumping of its load.

Figure 2 is a top plan view of the machine.

Similar reference characters indicate corresponding parts throughout the several views in the drawings.

Figure 3:
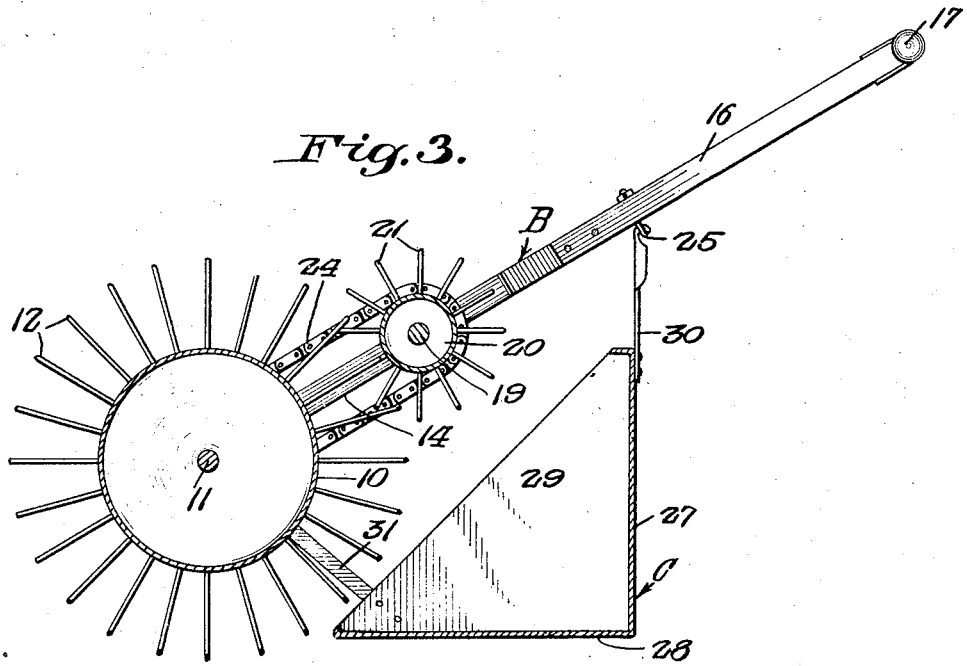
Figure 3 is a sectional view taken approximately on the line 3—3 of Figure 2 looking in the direction of the arrow.
Figure 4:
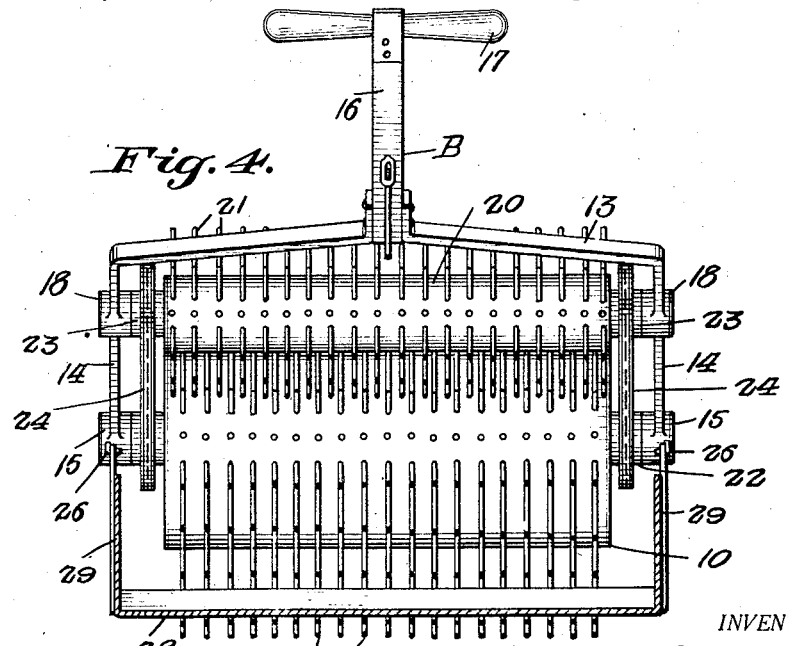
Figure 4 is a sectional view taken approximately on the line 4—4 of Figure 1 looking in the direction of the arrow.

Referring to the drawings, in detail, A designates generally the collector or gathering element, B the frame and C the pan or container, of the machine, these being hereinafter more fully described.

The collector or gathering element comprises a cylindrical drum 10 which is closed at opposite ends and is centrally fixed to a spindle 11, while projecting radially from the cylindrical surface of said drum 10 are rows of spaced picking or gathering fingers 12, each in the form of a tine of the required length so as to penetrate leaves, or have cling thereto the latter, twigs, grass or the like when resting loose upon the ground surface.

The frame B is formed with a fork 13, the side members 14 of which are provided with terminal bearings 15 in which are journaled the ends of the axial or spindle 11 of the drum 10, so that the collector or gathering element A will be rotatably supported in the frame B as will be clearly apparent.

Extending centrally from the fork 13 is a handle bar 16 having at its free end crossed handle grips 17 of conventional form.

Formed in the side members 14 of the fork 13 spaced inwardly from the bearings 15 are further bearings 18 in which is supported a journal 19, the latter having fixed thereto between the side members 14 of the fork 13 a roller in the form of a cylinder 20 of considerably less size than the drum 10 and this roller has projecting radially therefrom rows of spaced teeth or tines 21, which coact with the tines 12 on the drum 10 to remove therefrom leaves, twigs, grass or other loose matter collected thereby.

At one side of the fork 13 and fixed to the respective journals 11 and 19 are sprocket gears 22 and 23 over which is trained an endless sprocket chain 24 so that motion from the drum 10 will be imparted to the cylinder 20, the latter being rotated in a reverse direction to the direction of rotation of the drum 10, so that the tines 21 on the cylinder 20 will kick from the tines 12 of the drum 10 leaves, twigs and other loose matter collected thereon.

Mounted in the handle bar 16 contiguous to the frame B is an eye 25, while mounted in the bearings 15 at opposite sides of the fork 13 are hooks 26 and with these, including the eye 25 is detachably connected the pan or container C. This pan or container C comprises a body formed with a back 27, bottom 28 and ends 29, the latter being substantially triangular shaped so as to provide a relatively wide or large opening at the forepart of said pan or container C to assure the gathering of the loose matter when kicked from the element A by the tines 21 on the cylinder 20.

Mounted medially of the back 27 of the pan or container C is a resilient latch member 30 adapted for detachable hooking engagement in the eye 25, while connected to the ends 29 contiguous to the front of said pan or container C are rearwardly inclined hanger members 31, each having an eye terminal 32 to engage the hooks 26 on the bearings 15 of the fork 13 of the frame B. It will be clearly apparent that the pan or container C can be readily detached from the frame B when the occasion requires.

On the filling of the pan or container C with the collected leaves, twigs or grass, the operator of the machine lifts the handle bar 16 upwardly from the full line position in Figure 1 of the drawing to the dotted line position therein, whereby the pan or container C will be in a position to dump its load onto the ground or other place of deposit. In this manner the pan or container C is discharged of its contents or load.

In the operation of the machine when the same is to become active for collecting or gathering leaves, twigs or other loose matter upon the ground, it is in the positions as shown in Figures 1 and 3 of the drawings and when an operator pushes the machine over the ground, the element A will rotate and its tines 12 will gather up or collect the loose matter upon the ground, while the tines 21 on the cylinder 20 will kick such collected matter from the tines 12 and on the freezing of the matter it will fall into the pan or container C, where the latter will be collected and transported to a point for deposit thereof.

From the foregoing it is thought that the construction and manner of operation of the machine will be clearly understood and therefore a more extended explanation has been omitted.

What is claimed is:—

A leaf collector comprising a fork shaped member having secured thereto, centrally of its rear, a rearwardly extending handle bar, the sides of said member formed with a forward pair and a rear pair of aligning bearings, a front and rear spindle mounted in said bearings, a gathering element carried by and driving the forward spindle, a cleaner element for the gathering element carried by the rear spindle, means for driving the rear spindle from the forward spindle an open front container arranged rearwardly of said elements and below the same, a detachable connection between the container and handle bar centrally of the top of the rear of the container, and hanger members between the lower pair of bearings and the sides of said container.

In testimony whereof, I affix my signature hereto.

CLIFFORD C. MYRICK.